United States Patent [19]

Kato et al.

[11] 3,970,769

[45] July 20, 1976

[54] RECORDING SHEET AND METHOD FOR THE PRODUCTION THEREOF

[75] Inventors: Hajime Kato; Takao Hayashi, both of Fujimiya, Japan

[73] Assignee: Fuji Photo Film Co., Ltd., Minami-ashigara, Japan

[22] Filed: Oct. 15, 1974

[21] Appl. No.: 514,714

[30] Foreign Application Priority Data

Oct. 12, 1973 Japan .............................. 48-114435

[52] U.S. Cl. ................................ 427/145; 427/146; 427/150; 428/420; 428/488; 428/299

[51] Int. Cl.² ..................... B41M 5/22; B32B 27/42; B32B 9/02

[58] Field of Search ................. 117/36.7, 36.8, 36.9, 117/36.2; 161/263, 246, 235; 428/498, 499, 488, 420; 427/143–146, 150, 151

[56] References Cited

UNITED STATES PATENTS

| | | | |
|---|---|---|---|
| 3,244,548 | 4/1966 | Sullivan | 427/145 X |
| 3,244,549 | 4/1966 | Farnham et al. | 427/145 X |
| 3,432,327 | 3/1969 | Kan et al. | 117/36.9 X |
| 3,445,261 | 5/1969 | Talvalkar | 428/488 |
| 3,491,117 | 1/1970 | Han Lin | 117/36.9 X |
| 3,573,085 | 3/1971 | Hemstock | 117/36.9 X |
| 3,660,304 | 5/1972 | Matsukawa | 117/36.9 X |
| 3,723,156 | 3/1973 | Brockett et al. | 117/36.2 |
| 3,732,120 | 5/1973 | Brockett et al. | 117/36.9 X |
| 3,856,551 | 12/1974 | Jenkins | 117/36.9 X |
| 3,912,831 | 10/1975 | Kan et al. | 427/145 |
| 3,925,273 | 12/1975 | Cuthbertson et al. | 427/146 X |
| 3,928,702 | 12/1975 | Matsukawa et al. | 427/145 X |
| 3,931,430 | 1/1976 | Tada et al. | 427/150 X |
| 3,932,695 | 1/1976 | Davis et al. | 427/145 X |

*Primary Examiner*—Harold Ansher
*Attorney, Agent, or Firm*—Sughrue, Rothwell, Mion, Zinn & Macpeak

[57] ABSTRACT

A recording sheet comprising a support having a developer layer thereon, the developer layer containing a phenol resin and an aqueous emulsion of an oily material and produced by admixing a coating composition containing a phenol resin and an aqueous emulsion of an oily material and coating the resulting mixture on a support.

10 Claims, No Drawings

RECORDING SHEET AND METHOD FOR THE PRODUCTION THEREOF

BACKGROUND OF THE INVENTION

1. Field of the Invention

This invention relates to a recording sheet and a method for producing the sheet. In particular, this invention relates to an improvement in a recording sheet in which a phenol resin is used as a developer.

2. Description of the Prior Art

Recording sheets have been known in the past in which the coupling reaction of an electron donating colorless organic compound (hereinafter referred to as a color former) and an electron accepting solid acid (hereinafter referred to as a developer) is utilized, for example, the pressure-sensitive copying papers as described, e.g., in U.S. Pat. Nos. 2,505,470, 2,505,489, 2,550,471, 2,548,366, 2,712,507, 2,730,456, 2,730,457, and 2,972,547; the heat-sensitive copying papers as described, e.g., in U.S. Pat. No. 2,939,009; and the recording materials as described, e.g., in German OLS No. 1,939,624.

Clays (such as terra alba, activated clay and attapulgite), organic acids (such as succinic acid, tannic acid, gallic acid, salicylic acid and phenols) and acid polymers (such as phenolformaldehyde resins) are known as a developer. In particular, phenol resins are somewhat different from other developers, probably due to their polymeric property, and are particularly advantageous from the standpoint of practical use. Numerous references in the prior art with respect to phenol resins are known, for example, as disclosed in U.S. Pat. Nos. 3,501,331, 3,669,711, 3,427,180, 3,445,721, 3,516,845, 3,634,121, 3,672,935 and 3,732,120.

According to the prior art, a phenol resin is dissolved in an organic solvent and, if necessary, after dispersion into an aqueous solution to prepare an aqueous dispersion, coated on a support. However, conventional developer sheets thus obtained do not have sufficient developability and tend to yellow. In addition, the light resistance of the developed color images formed on these sheets is not sufficient from a practical standpoint.

SUMMARY OF THE INVENTION

A first object of this invention is to provide a recording sheet having improved developability.

A second object of this invention is to provide a recording sheet capable of developing a color image having improved light resistance.

A third object of this invention is to provide a recording sheet which hardly yellows.

These objects can be attained with a developer composition containing a phenol resin and an aqueous emulsion of an oily material on a support.

Accordingly, this invention provides a recording sheet comprising a support having thereon a developer layer containing a phenol resin and an aqueous emulsion of an oily material. In another embodiment of this invention, this invention provides a method for producing this recording sheet comprising coating a composition containing a phenol resin admixed with an aqueous emulsion of an oily material on a support.

DETAILED DESCRIPTION OF THE INVENTION

It is already known to improve the developability of a recording sheet by adding an aqueous emulsion of an oily material which is liquid at ordinary temperature (e.g., 20°–30°C) to clays as a developer (for example, as disclosed in British Pat. No. 1,290,369). In this case, it is believed that the emulsion renders the active sites of the clays hydrophobic, that is, it increases the affinity of clays to a developer solution, whereby the developability of the recording sheet would be improved. This phenomenon has been variously studied in an effort to attain the above-described objects of this invention. As a result thereof, it was found that a phenol resin and a water dispersible emulsion of an oily material have an extremely specific relation.

Accordingly, the objects of this invention are attained by admixing a phenol resin coating composition and an aqueous emulsion of an oily material.

Phenol resins are described in detail in the above patents. In addition, a brief explanation of phenol resins is given below.

Phenol resins which can be used in this invention are phenol resins capable of donating hydrogen ions as is generally known in this technical field. Phenol-aldehyde polymers (the so-called novolak type phenol resins) and phenol-acetylene polymers are typical examples. Suitably the phenol formaldehyde molar ratio is usually about 1:1 and the degree of condensation ranges from about 2 to 50, preferably 5 to 20.

Representative examples of these phenol resins are as follows: p-phenylphenol-formaldehyde polymer, p-fluorophenol-formaldehyde polymer, p-chlorophenol-formaldehyde polymer, p-bromophenol-formaldehyde polymer, p-iodophenol-formaldehyde polymer, p-nitrophenol-formaldehyde polymer, p-carboxyphenol-formaldehyde polymer, p-carboxyphenol-formaldehyde polymer, p-carboalkoxyphenol-formaldehyde polymer, p-aroylphenol-formaldehyde polymer, p-lower alkoxyphenol-formaldehyde polymer, p-alkyl($C_1$-$C_{12}$)-phenol-formaldehyde polymers, in which the p-alkyl($C_1$-$C_{12}$)-phenol is p-methylphenol, p-ethylphenol, p-n-propylphenol, p-isopropylphenol, p-n-amylphenol, p-isoamylphenol, p-cyclohexylphenol, p-1,1-dimethyl-n-propylphenol, p-n-hexylphenol, p-isohexylphenol, p-1,1-dimethyl-n-butylphenol, p-1,2-dimethyl-n-butylphenol, p-n-heptylphenol, p-isoheptylphenol, p-5,5-dimethyl-n-amylphenol, p-1,1-dimethyl-n-amylphenol, p-n-octylphenol, p-1,1,3,3-tetramethylbutylphenol, p-isooctylphenol, p-n-nonylphenol, p-isononylphenol, p-1,1,3,3-tetramethylamylphenol, p-n-decylphenol, p-isodecylphenol, p-n-undecylphenol, p-isoundecylphenol, p-n-dodecylphenol, etc., and polymers of formaldehyde and isomers of these p-alkyl-phenols where the alkyl groups have 1 to 12 carbon atoms, and copolymers of formaldehyde and mixtures containing two or more of these alkylphenols and the isomers thereof. Where these p-substituted phenols are further substituted at the m-position, the resulting p- and m- substituted phenols behave analogously to the p-substituted phenols, and therefore, the addition of m-substituent(s) to the p-substituted phenols does not provide any important advantage.

In the present invention, phenols are dissolved in a solvent (for example, toluene, xylene, petroleum distillation fractions, perchloroethylene, etc.) and then, if desired, dispersed in water. That is, the phenol resin coating composition of this invention can be a dispersion of phenol resin fine particles which is generally used, and the production of the coating composition need not be specifically described in detail herein.

For example, the phenol resin coating composition of this invention can be prepared as follows. Pulverized fine particles of a phenol resin are dispersed in water, or a phenol resin is milled in a ball mill in the presence of gum arabic or the like, and dispersed in water, and, if desired, a conventional developer such as terra alba or activated clay for increasing the developability and/or an inorganic pigment for increasing the adsorbability is added thereto, and, if desired, a binder is further added thereto, to form a phenol resin coating composition. The binder can be any conventional binder which is well-known in this technical field. Illustrative examples of binders are latexes such as styrene-butadiene copolymer latex and synthetic or natural high molecular weight substances such as polyvinyl alcohol, maleic acid anhydride-styrene copolymers, starch, casein, gum arabic, gelatin, carboxymethyl cellulose and methyl cellulose. The amount of a binder used can vary somewhat depending upon the kind of the binder used or the amount and kind of other additives used, but the binder is generally used in an amount of 5 parts by weight or more, preferably 10 to 50 parts by weight, per 100 parts by weight of the solid content in the coating composition. The amount of the binder to be added is determined by balancing the developability and the film surface strength of the developer layer formed and therefore, the smaller the amount of the binder the better as long as a sufficient film surface strength is obtained.

According to conventional techniques, a solution or an aqueous dispersion of a phenol resin (or a phenol resin coating composition) is coated on a support. However, in the present invention, it is to be noted that the phenol resin coating composition is admixed with an aqueous emulsion of an oily material. The term oily material as used herein designates a hydrophobic material, including vegetable oils, animal oils, mineral oils, synthetic oils and hydrophobic organic solvents. The oily material can be a solid, but it is especially preferably a liquid (at normal temperature of about 20°–30°C) since solids must be heated when preparing an emulsion. If solids are used, they can be liquefied by heating to about 30° to 100°C before and during emulsification. Representative examples are vegetable oils such as olive oil, castor oil, cotton seed oil, soybean oil, lemon oil, corn oil, sesame oil and rice oil; animal oils such as fish oil and whale oil; mineral oils such as those obtainable from petroleum, for example, various kinds of paraffins, kerosene and petroleum naphtha; synthetic oils such as alkylated naphthalenes, alkylated diphenyls, alkylated diphenylmethanes, octyl diphthalate, tricresyl phosphate, silicone oil and fluorine-containing oils; organic solvents such as benzene, toluene, xylene and chlorobenzene. Vegetable oils and animal oils themselves tend to yellow, and with oily materials having a low boiling point such as benzene, toluene and xylene, safeguards against explosion need to be observed. Accordingly, aliphatic hydrocarbons, halogenated hydrocarbons and silicone oil are preferred. However, halogenated hydrocarbons and silicone oil cause coated mottles to occur on a coated paper, since they are highly repellant to water. Liquid paraffin is the most preferred oily material, satisfying all the above conditions.

The preparation of an aqueous emulsion using the above-described oily material can be carried out using conventional emulsifying and dispersing processes. For example, an oily material is emulsified using a stirring device with a high shearing power such as homomixer or an ultrasonic emulsifying apparatus. In this case, if desired, a conventional emulsifying agent can be used. Examples of emulsifying agents are synthetic surface active agents such as soap, sodium salts of higher alcohol sulfates and alkylbenzene sodium sulfonates; and gelatin, albumin, casein, gum arabic, tragacanth gum, alginates, carboxymethyl cellulose, saponin and polyvinyl alcohol. The emulsifying agent used in the present invention can be any agent which can provide a stable emulsion of the oily material used, and the kind thereof is not specifically limited. A suitable particle size for the emulsified oily material can range from about 0.0001 $\mu$ to about 10 $\mu$, preferably 0.001 to 1 $\mu$. The amount of the oily material emulsion admixed with the phenol resin coating composition is about 0.1 part by weight or more, preferably 1 to 10 parts by weight, calculated in terms of the oily material, per 100 parts by weight of the solid content in the phenol resin coating composition.

The production of the recording sheet in the present invention can be carried out as follows. A phenol resin coating composition containing an aqueous emulsion of an oily material is coated on a support such as paper, synthetic paper or a film, in an amount of about 0.1 $g/m^2$ or more, preferably 0.3–2 $g/m^2$, calculated in terms of the phenol resin used. Where the support has a color former layer thereon, this may be dealt with in an analogous manner. Further, a developer layer can be coated on a support having a color former layer on the surface opposite to that to be coated with the developer layer, or a color former layer can be coated on the developer layer formed. The upper limit of the amount of the developer layer composition to be coated is determined mainly by economic reasons, and therefore, the effect of the present invention is still effective even outside the above-described range.

Phenol resins naturally have a high affinity for the color former composition, and thus, the effect of the oily material emulsion to the phenol resin is different from the case of clays. More precisely, it is believed that an oily material emulsion would affect the adsorptive surface area of a phenol resin to a color former composition. As a result thereof, not only is the developability of the phenol resin improved but also the yellowing thereof is markedly reduced, and further, the light resistance of the developed color image formed on the phenol resin developer layer is improved. This means that the effects of this invention cannot be attained when an aqueous emulsion of an oily material is added to clays.

It is especially to be noted that if a phenol resin coating composition and an aqueous emulsion of an oily material are separately coated or if an oily substance is directly added to a phenol resin coating composition and coated, the above-described effects of this invention can not be attained. A characteristic element of recording sheet of this invention is the provision of a specific developer layer, and the above-described other conditions such as the kind and form of a color former to be used and the kind of a solvent to be used can be those conventionally employed. One skilled in the art can easily select optimum color formers, solvents and the like.

Color formers or couplers which are suitable for the recording sheet of this invention include eall substances which accept electrons or donate protons, or those capable of being colored when reacted with a developer. These couplers are, for example, diarylmethane compounds (as described in U.S. Pat. Nos. 2,828,342, and 2.983,756, etc.), triarylmethane compounds (as described in U.S. Pat. Nos. 2,474,084 and 3,032,041, etc.), fluoran compounds (as described in U.S. Pat. Nos. 3,514,310, 3,514,311, 3,531,331, 3,624,107, 3,627,787 and 3,637,757, etc.), spiro-pyran compounds (as described in British Pat. No. 810,401, U.S. Pat. No. 3,293,060, etc.) and leucoazine compounds (as described in British Pat. No. 791,426 and U.S. Pat. No. 2,915,415). Representative examples of thesee color formers are triarylmethane compounds such as 3,3-bis(p-dimethylaminophenyl)-6-dimethylaminophthalide or Crystal Violet Lactone, 3,3-bis(p-dimethylaminophenyl)phthalide, 3-(p-dimethylaminophenyl)-3-(1,2-dimethylindol-3-yl)phthalide, 3-(p-dimethylaminophenyl)-3-(2-methylindol-3-yl)phthalide, 3-(p-dimethylaminophenyl)-3-(2-phenylindol-3-yl)phthalide, 3,3-bis-(1,2-dimethylindol-3-yl)-5-dimethylaminophthalide, 3,3-bis-(1,2-dimethylindol-3-yl-6-dimethylaminophthalide, 3,3-bis-(9-ethyl-carbazol-3-yl)-5-dimethylaminophthalide, 3,3-bis-(2-phenylindol-3-yl)-5-dimethylaminophthalide, 3-p-dimethylaminophenyl-3-(1-methyl-pyrol-2-yl)-6-dimethylaminophthalide; diphenylmethane compounds such as 4,4'-bis-dimethylaminobenzhydrinbenzylether, N-halophenyl-leuco-Auramine, N-2,4,5-trichlorophenyl-leuco-Auramine; xanthene compounds such as Rhodamine B-anilinolactam, Rhodamine B-p-nitroanilinolactam, Rhodamine B-p-chloroanilinolactam, 7-dimethyl-amino-2-methoxyfluoran, 7-diethylamino-2-methoxyfluoran, 7-diethylamino-3-methoxyfluoran, 7-diethylamino-3-chlorofluoran, 7-diethylamino-3-chloro-2-methylfluoran, 7-diethylamino-2,2-dimethylfluoran, 7-diethylamino-3-acetylmethylaminofluoran, 7-diethylamino-3'-methylaminofluoran, 3,7-diethylaminofluoran, 7-diethylamino-3-dibenzylaminofluoran, 7-diethylamino-3-methyl-benzylaminofluoran, 7-diethylamino-3-chloroethylmethylaminofluoran, 7-diethylamino-3-diethylaminofluoran; thiazine compounds such as benzoyl-leuco-methylene blue, p-nitrobenzyl-leuco-methylene blue; spiro compounds such as 3-methyl-spiro-dinaphthopyran, 3-ethyl-spiro-dinaphthopyran, 3,3-dichloro-spiro-dinaphthopyran, 3-benzyl-spiro-dinaphthopyran, 3-methyl-naphtho-(3-methoxybenzo)-spiropyran, 3-propyl-spiro-dibenzopyran, etc., and mixtures of these compounds.

The color former can be encapsulated or can be dispersed in a binder solution and coated on a support. A suitable coating amount of the color former can range from about 0.01 to 2 g/m$^2$ of the support. The binder and support can be the same binders and supports as described above.

Suitable solvents which can be used are natural or synthetic oils, either alone or in combination. Examples of solvents are cotton seed oil, kerosene, paraffins, naphthene oils, chlorinated biphenyl, chlorinated terphenyl, alkylated biphenyls, alkylated terphenyls, chlorinated paraffins and alkylated naphthalenes. The productions of the capsules can be carried out, for example, using a method where a coacervation of a hydrophilic colloid sol is utilized, as described in U.S. Pat. Nos. 2,800,457 and 2,800,458, or using an interfacial polymerization method as described in British Pat. Nos. 867,797, 950,443, 989,264 and 1,091,076.

The recording sheet of this invention can be produced and used in accordance with prior techniques with respect to other factors than those specifically indicated above.

The recording sheet of this invention has an extremely excellent developability over other conventional recording sheets produced using phenol resins, and the light resistance of the developed color image formed thereon is markedly improved. Moreover, the recording sheet of the present invention yellows less when exposed to air or light.

This invention will be explained in greater detail in the following Examples where all parts and percents are by weight unless otherwise specifically indicated.

The effect of this invention was confirmed using a combination of an upper sheet produced by coating microcapsules on a support, the microcapsules being prepared using the process as described below, and a lower sheet produced by coating a developer of this invention on a support.

The microcapsules containing a coupler can be prepared using various conventional methods, and those used herein were prepared as follows, according to U.S. Pat. No. 2,800,457.

10 parts of an acid-treated pigskin gelatin and 10 parts of gum arabic were dissolved in 400 parts of water at 40°C, 0.2 part of Turkey red oil was added thereto as an emulsifying agent, and 40 parts of a color former oil were emulsified and dispersed therein. The color former oil used was prepared by dissolving 2% Crystal Violet Lactone or 3-N,N-dibenzylamino-7-N,N-diethylaminofluoran in diisopropylnaphthalene.

When the size of the oil droplets became about 5 $\mu$, on the average, the emulsification was stopped. Water at 40°C was added to the resulting emulsion to make 900 parts in total and then the entire amount was continuously stirred.

Next, a 10% acetic acid aqueous solution was added thereto to adjust the pH of the emulsion to 4.0–4.2 and to cause coacervation.

While further continuously stirring, the emulsion was cooled with ice water after 20 minutes whereby the coacervate films deposited around the oil droplets were gelled. After the temperature of the solution became 20°C, 7 parts of a 37% formaldehyde aqueous solution were added to the solution. When the temperature became 10°C, a sodium hydroxide aqueous solution was added to the solution to adjust the pH thereof to 9. Afterwards, the solution was heated for 20 minutes, while stirring, to increase the temperature thereof to 50°C.

After the thus prepared microcapsule dispersion was adjusted to a temperature of 30°C, this dispersion was coated on paper of a weight of 40 g/m$^2$ in an amount of 5 g/m$^2$ (calculated in terms of the solid content coated) and dried to form a microcapsule coated sheet to be used for the following examples.

EXAMPLE 1

In a solution of 50 parts of water, 1 part of sodiumm caseinate and 1 part of a 20% potassium hydroxide aqueous solution were emulsified 50 parts of an oily material as described in the following Table 1 using an ultrasonic emulsifying apparatus, until the particle size of the emulsified material became 0.1–0.5 $\mu$, to prepare an O/W emulsion.

Next, 170 parts of p-phenylphenol and 70 parts of a 37% formaldehyde aqueous solution were reacted for 10 hours, while stirring under reflux, in the presence of 10 parts of a 37% hydrochloric acid aqueous solution and 50 parts of water. After being cooled, the resulting phenol resin was removed in the form of a powder.

measured with a Hunter Whiteness Meter. The results obtained are shown in the following Table 1.

Table 1

| Sample No. | Oily Material | Added Amount | Whiteness after Irradiation with Atlas Fade Meter | Crystal Violet Lactone | | 3-N,N-Dibenzylamino-7-N, N-diethylaminofluoran | |
|---|---|---|---|---|---|---|---|
| | | | | Developed Color Density with Typewriter[1] | Density after Fluorescent Light Exposure | Developed Color Density with Typewriter | Density after Fluorescent Light Exposure |
| 1 | Liquid Paraffin | 0 | 65.0 | 2 | 1 | 2 | 1 |
| 2 | " | 8 | 67.5 | 4 | 3 | 4 | 3 |
| 3 | " | 16 | 68.9 | 5 | 4 | 5 | 4 |
| 4 | Fluorinated-chlorinated Ethylene | 8 | 65.5 | 3 | 2 | 3 | 2 |
| 5 | " | 16 | 66.2 | 4 | 3 | 4 | 3 |
| 6 | Silicone Oil | 8 | 67.8 | 3 | 2 | 3 | 2 |
| 7 | " | 16 | 69.0 | 4 | 3 | 4 | 2 |
| 8 | Xylene | 8 | 65.2 | 4 | 3 | 4 | 2 |
| 9 | " | 16 | 65.5 | 4 | 3 | 4 | 3 |

[1]Note:
The higher the number, the higher the developed color density 40 parts of the above-obtained phenol resin and 6 parts of naphthalene sulfonic acid-formaldehyde condensation product were milled in a ball mill together with 54 parts of water for 1 day. Next, 100 parts of the resulting phenol resin dispersion, 160 parts of kaolin and as a binder 40 parts of a styrene-butadiene latex were placed in 500 parts of water and fully stirred and admixed, and then 8 parts or 16 parts of the above-prepared oily material emulsion dispersed in water were added thereto and stirred to prepare a coating composition. The thus prepared coating composition was coated on a base paper of a weight of 50 g/m² with a coating rod in an amount of 5 g/m² (calculated in terms of the solid content coated) and then dried.

COMPARATIVE EXAMPLE 1

A coating composition was prepared in the same manner as in Example 1, with the exception of the addition of the oily substance material dispersed in water, and coated on a base paper of a weight of 50 g/m² with a coating rod in an amount of 5 g/m² (calculated in terms of the solid content coated) and dried.

COMPARATIVE EVALUATION 1

On the developer sheets of Example 1 and Comparative Example 1 was superposed a microcapsule sheet containing Crystal Violet Lactone or 3-N,N-dibenzylamino-7-N,N-diethylaminofluoran, and the resulting sheets were typed on with a typewriter and the respective developed color density was compared with each other. In addition, the developed color image formed on each sheet was allowed to stand in a room where a fluorescent lamp was kept lighted for 2 weeks to compare the degradation of the color density of each color image.

On the other hand, the developer surface of each developer sheet was irradiated with an Atlas Fade Meter (mercury-vapor lamp 500W) for 30 minutes. The degree of yellowing of the developer surface was

EXAMPLE 2

194 parts of p-tert-butylphenol and 65 parts of a 37% formaldehyde aqueous solution were heated under reflux for 12 hours in the presence of 10 parts of a 37% hydrochloric acid aqueous solution, 1 part of oxalic acid and 50 parts of water. After being cooled, a phenol resin powder was obtained. 100 parts of the above prepared phenol resin, 350 parts of activated clay and 20 parts of gum arabic were dispersed in 1500 parts of water, and after the pH of the resulting dispersion was adjusted to 9 with a 10% sodium hydroxide aqueous solution, the dispersion was milled in a ball mill for 1 day, and after the milling, 140 parts of a styrene-butadiene-latex("Dow Latex 636") were added thereto and the mixture was fully stirred and admixed.

To this were added 10 parts or 20 parts of a water dispersed emulsion of an oily material as shown in the following Table 2 which was prepared in the same manner as in Example 1 with the exception that sodium oleate was used in place of sodium caseinate, and stirred to form a coating composition. The thus prepared coating composition was coated on a base paper of a weight of 50 g/m² with a coating rod in an amount of 5 g/m² (calculated in terms of the solid content coated), and dried.

COMPARATIVE EXAMPLE 2

A coating composition was prepared in the same manner as in Example 2, with the exception of the addition of the oily material emulsion dispersed in water, and was coated on a base paper of a weight of 50 g/m² with a coating rod in an amount of 5 g/m² (calculated in terms of solid content coated) and dried.

COMPARATIVE EVALUATION 2

The developer sheets produced in the above Example 2 and Comparative Example 2 were tested in the same manner as in Comparative Evaluation 1, and the results obtained are given in the following Table 2.

Table 2

| Sample No. | Oily Material | Added Amount | Whiteness after Irradiation with Atlas Fade Meter | Crystal Violet Lactone | | 3-N,N-Dibenzylamino-7-N,N-diethylaminofluoran | |
|---|---|---|---|---|---|---|---|
| | | | | Developed Color Density with Typewriter[1] | Density after Fluorescent Light Exposure | Developed Color Density with Typewriter | Density after Fluorescent Light Exposure |
| 10 | Liquid Paraffin | 0 | 64.2 | 3 | 2 | 3 | 2 |
| 11 | " | 10 | 66.9 | 5 | 4 | 5 | 4 |
| 12 | " | 20 | 68.4 | 6 | 5 | 6 | 5 |
| 13 | Fluorinated-chlorinated Ethylene | 10 | 65.0 | 4 | 3 | 4 | 3 |
| 14 | " | 20 | 65.8 | 5 | 4 | 5 | 4 |
| 15 | Silicone Oil | 10 | 67.2 | 4 | 3 | 3 | 3 |
| 16 | " | 20 | 68.5 | 5 | 4 | 4 | 4 |
| 17 | Xylene | 10 | 65.0 | 4 | 3 | 3 | 3 |
| 18 | " | 20 | 65.3 | 5 | 4 | 4 | 4 |

[1]Note:
The higher the number, the higher the developed color density

From the above results, the following conclusions can be drawn. The addition of an aqueous emulsion of an oily material to a developer coating composition containing a phenol resin brings about a marked improvement in the developability of a developer sheet when typed upon with a typewriter, and further brings about a marked reduction of the disadvantageous yellowing of a developer sheet containing a phenol resin, when irradiated with light.

While the invention has been described in detail and with reference to specific embodiments thereof, it will be apparent to one skilled in the art that various changes and modifications can be made therein without departing from the spirit and scope thereof.

What is claimed is:

1. A method for producing a recording sheet comprising admixing a phenol resin selected from a novolak type phenol-aldehyde polymer or a phenol-acetylene polymer and an aqueous emulsion of a hydrophobic material to produce a coating composition and coating the resulting coating composition on a support; said hydrophobic material being selected from the group consisting of a vegetable oil, an animal oil, a mineral oil, a synthetic oil or a hydrophobic organic solvent; said hydrophobic material emulsion being used in an amount of between about 0.1 to 10 parts by weight calculated in terms of the amount of the hydrophobic material per 100 parts by weight of the solid content in the phenool resin coating composition; and said phenol resin being capable of being colored when reacted with an electron donating colorless organic compound.

2. The method as claimed in claim 1, wherein said hydrophobic material is a liquid at a temperature of about 20° to 30°C.

3. The method as claimed in claim 1, wherein said hydrophobic material is liquid paraffin.

4. The method as claimed in claim 1, wherein the amount of said hydrophobic material emulsion is 1 to 10 parts by weight calculated in terms of the amount of the hydrophobic material per 100 parts by weight of the solid content in the phenol resin coating composition.

5. The method as claimed in claim 1, wherein said support is a synthetic paper.

6. The method as claimed in claim 1, wherein said support is in the form of a film.

7. The method as claimed in claim 1, wherein said phenol resin is in the form of fine particles.

8. The method as claimed in claim 1, wherein said hydrophobic organic solvents are selected from the group consisting of benzene, toluene, xylene and chlorobenzene.

9. The method as claimed in claim 1, wherein said support is paper and the coating is in an amount of at least about 0.1 $g/m^2$ calculated in terms of the amount of the phenol resin.

10. The method as claimed in claim 9, wherein the coating amount is 0.3 to 2 $g/m^2$ calculated in terms of the amount of the phenol resin.

* * * * *